(12) United States Patent
Youngpeter et al.

(10) Patent No.: US 7,350,616 B2
(45) Date of Patent: Apr. 1, 2008

(54) POWER STEERING PUMP HAVING ELECTRONIC BYPASS CONTROL

(75) Inventors: Bryan Youngpeter, Orion, MI (US); Dale C. Killins, Detroit, MI (US); Stephen T. Hung, Grosse Pointe, MI (US); Timothy M. Staton, Ypsilanti, MI (US); Scott L. Radabaugh, Ann Arbor, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 419 days.

(21) Appl. No.: 10/631,363

(22) Filed: Jul. 31, 2003

(65) Prior Publication Data
US 2004/0042912 A1  Mar. 4, 2004

Related U.S. Application Data

(60) Provisional application No. 60/407,918, filed on Sep. 3, 2002.

(51) Int. Cl.
*B62D 5/06* (2006.01)

(52) U.S. Cl. .................. 180/422; 180/441; 417/300

(58) Field of Classification Search ............. 417/310, 417/440; 137/115.03, 115.09; 180/422, 180/441
See application file for complete search history.

(56) References Cited

U.S. PATENT DOCUMENTS

| | | | | |
|---|---|---|---|---|
| 4,917,139 A | * | 4/1990 | Narumi et al. | 137/110 |
| 5,822,988 A | * | 10/1998 | Kato | 60/468 |
| 5,860,797 A | * | 1/1999 | Fujimura et al. | 417/440 |
| 5,887,612 A | | 3/1999 | Bleitz et al. | |
| 6,041,883 A | * | 3/2000 | Yokota et al. | 180/422 |
| 6,079,955 A | * | 6/2000 | Miyazawa et al. | 417/213 |
| 6,287,094 B1 | | 9/2001 | Bleitz et al. | |

* cited by examiner

*Primary Examiner*—Devon C. Kramer
*Assistant Examiner*—Peter J Bertheaud

(57) ABSTRACT

A power steering pump comprises a housing that includes a bore, a fluid discharge port that supplies pumped fluid into the bore, and a fluid bypass port for recycling excess fluid to the pumping elements. The pump outlet is at one end of the bore. A flow control valve is slideably received in the bore and regulate the size of the inlet to the fluid bypass port. The pump includes a solenoid assembly that has a plunger that is operatively connected to the flow control valve through the second end of the bore opposite the pump outlet. By adjusting the magnitude of the current to the electromagnetic coil of the solenoid assembly, the position of the flow control valve is varied to increase or decrease fluid flow to the fluid bypass port and thereby regulate the output from the pump.

5 Claims, 2 Drawing Sheets

POWER STEERING PUMP HAVING ELECTRONIC BYPASS CONTROL

RELATED APPLICATIONS

The present patent document claims the benefit of the filing date under 35 U.S.C. §119(e) of Provisional U.S. Patent Application Ser. No. 60/407,918, filed Sep. 3, 2002, which is hereby incorporated by reference.

TECHNICAL FIELD OF THE INVENTION

This invention relates to a power steering pump wherein the fluid output is controlled by recycling a portion of the pump fluid through a bypass within the pump. More particularly, this invention relates to such power steering pump that includes a valve for controlling the size of the opening to the bypass.

BACKGROUND OF THE INVENTION

A power steering system of an automotive vehicle comprises a pump for providing hydraulic fluid under pressure. A typical power steering pump comprises a rotor having retractable vanes and rotating within a cam chamber. During operation, hydraulic fluid is drawn into the cam chamber from a fluid suction passage and pumped out under pressure to a fluid discharge port. A rotor is driven by the engine through a belt and pulley. As the speed of the engine increases, the volume of fluid pumped by the rotor also increases, and exceeds the volume required by the power steering system for optimum operation. The output from the pump is maintained at an optimum value by recycling a portion of the pumped fluid through a bypass in the pump housing, so that pumped fluid is diverted from the outlet and returned to the suction passage. At low engine speeds, the bypass is closed so that the entire volume of pumped fluid is outputted from the pump. However, at higher engine speeds, the bypass is open for recycling as much as 90% of the pumped fluid.

U.S. Pat. No. 5,887,612, issued Bleitz et al. in 1999, shows a mechanical valve for opening and closing a fluid bypass port to regulate the output from the pump. For this purpose, the housing defines a bore that communicates with a fluid discharge port from the pumping chamber and with the fluid bypass port. The outlet from the pump is located at one end of the bore and comprises a constricted passage to limit fluid output to a desired volume. Within the bore, a flow control valve slides to open and close the bypass port. The valve is biased in the closed position by a spring. During operation, particularly at higher engine speeds, the increased pressure of fluid from the fluid bypass port acts upon the valve to contract the spring and open the bypass port, thereby diverting excess fluid from the outlet and recycling fluid through the bypass port.

Because of the restrictive outlet, the pump maintains a relatively constant output volume. Since the output is restricted, the excess fluid tends to push the spring-biased valve into the fully open position at higher engine speeds. This effectively results in energy being wasted from turning the pump to provide fluid that is not required. It is known to provide a variable volume power steering pump wherein the size of the cam chamber is varied. During operation, the volume of pumped fluid is regulated by adjusting the cam chamber, and does not required fluid to be recycled through a bypass port. However, mechanisms for controlling the size of the cam chamber are complicated and require additional in-pump components and controls.

Therefore, a need exists for a power steering pump having a variable output, in which, a portion of the pumped fluid is recycled through a bypass within the pump, and further in which the portion through the bypass is controlled to obtain a desired output from the pump.

BRIEF SUMMARY OF THE INVENTION

In accordance with this invention, a power steering pump comprises a housing defining a bore having an axis, a first bore end and a second bore end. A fluid discharge port communicates with the bore at a first axial location and supplies fluid to the pump outlet, which is located at the first bore end. A fluid bypass port communicates at a second axial location. A flow control valve is slideably received in the bore and is adapted for opening and closing the fluid bypass port. When opening the fluid bypass port, the flow control valve defines an inlet having a size that depends upon the position of the flow control valve within the bore. In accordance with this invention, electrical means are connected to the flow control valve through the second bore end to adjust the position of the flow control valve within the bore to vary the size of the inlet and thereby regulate the flow of fluid into the fluid bypass port. By adjusting the position of the flow control valve through the second bore end apart for the pump outlet, this invention provides a construction that is readily manufactured with a reduced number of components, and thereby reduces the cost of the pump.

In one aspect of this invention, the fluid flow control valve is operatively connected to a plunger that is responsive to an applied electromagnetic field. The plunger slides within the bore or an extension thereof. An electromagnetic coil is provided outside the bore for applying an electromagnetic field to actuate the plunger. The position of the flow control valve depends upon the magnitude of the applied electromagnetic field, which in turn is regulated by the flow of current to the electromagnetic coil. By controlling electrical current to the electromagnetic coil, the size of the opening to the bypass port is adjusted to control the proportion of fluid recycled through the bypass port. In this manner, the output from the pump may be varied as desired to optimize performance depending upon driving conditions.

BRIEF DESCRIPTION OF THE DRAWINGS

This invention will be further described with reference to the following drawings wherein.

DETAILED DESCRIPTION OF THE INVENTION

Figure 1:
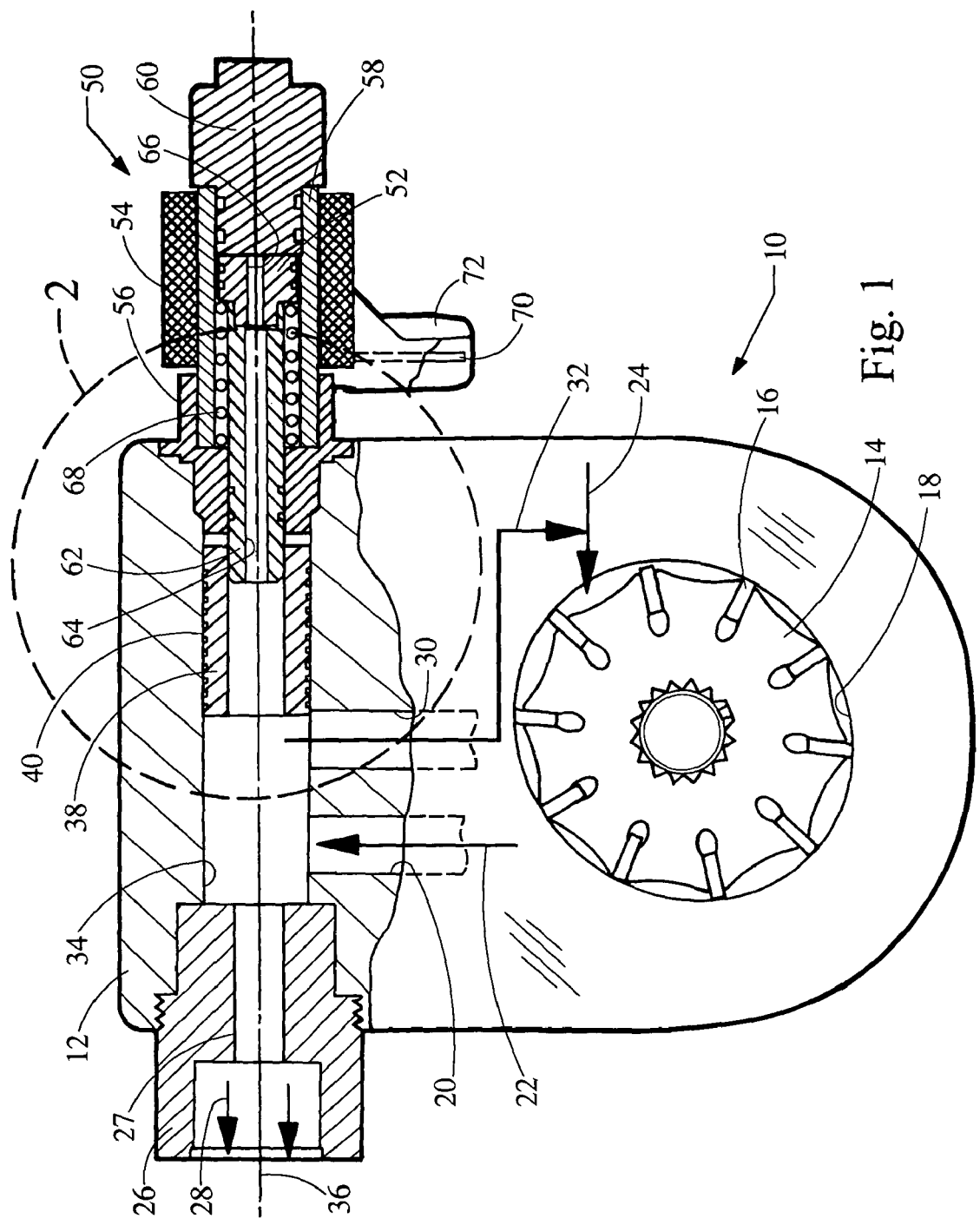
FIG. 1 is a cross-sectional view, partially in schematic, of a power steering pump in accordance with this invention and showing a flow control valve in an open bypass position.
Figure 2:
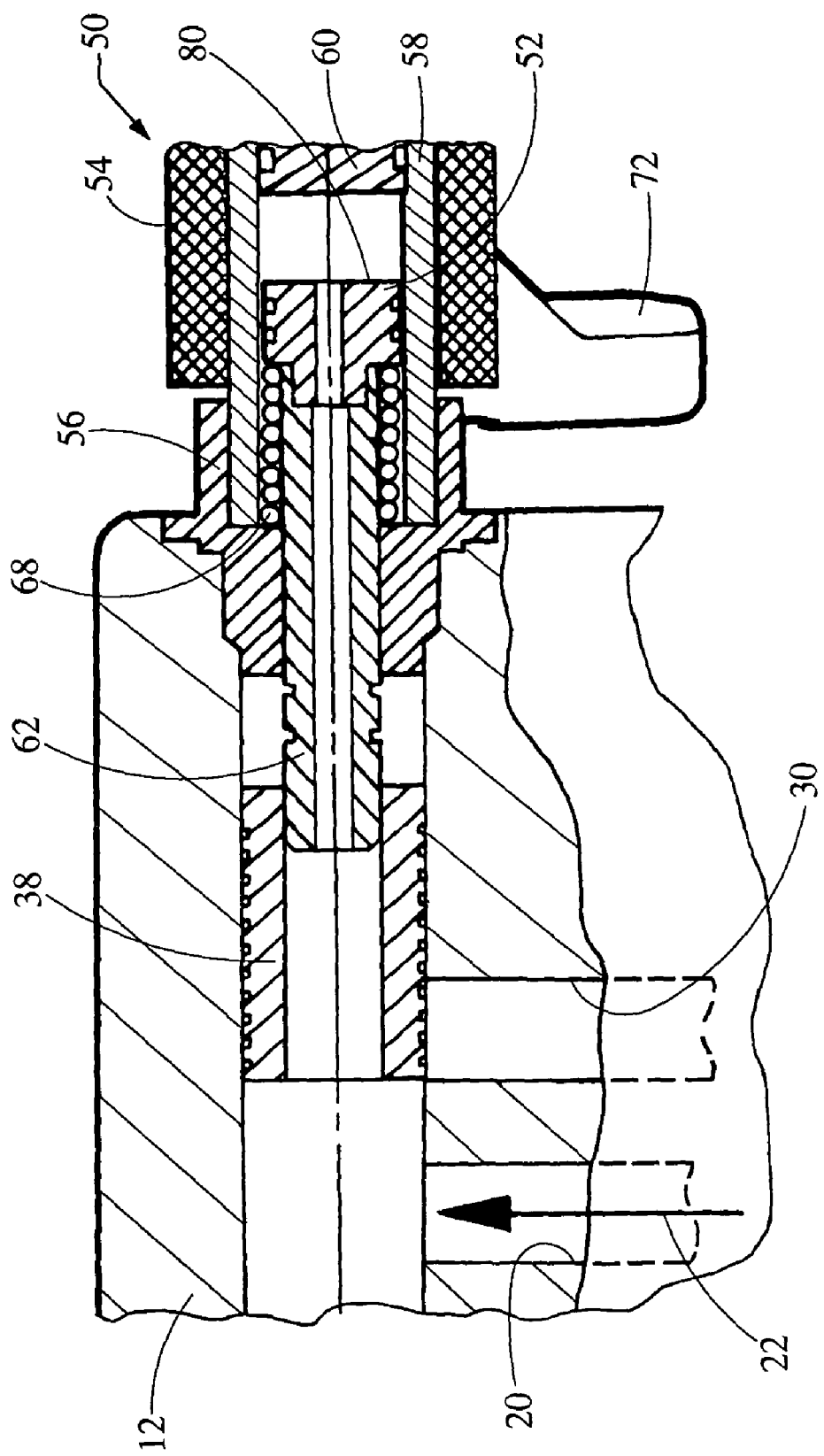
FIG. 2 is a cross-sectional view of a portion of a power steering pump in FIG. 1, showing the elements thereof in a bypass closed position.

In accordance with a preferred embodiment of this invention, referring to FIGS. 1 and 2, there is depicted a power steering pump 10 for supplying pressurized fluid for a power steering system of an automotive vehicle. Pump 10 comprises a housing 12, preferably formed of aluminum alloy. Housing 12 contains pumping element, showing schematically, that include a rotor 14 that propels retractable vane 16 within a cam chamber 18. Housing 12 defines a fluid discharge port 20 that carries fluid under pressure from cam chamber 18, as indicated by arrow 22. The housing also defines a suction passage, indicated by arrow 24, for delivering fluid to cam chamber 18. During operation, rotor 14 is driven by the automotive engine via a belt and pulley arrangement. Fluid is pumped under pressure to discharge port 20 and exists through an outlet 27 in adapter 26, as output 28. Adapter 26 is connected through tubing to a rotary valve and steering gear of the power steering system. Fluid is returned to the pump through a return line (not shown) connected to suction passage 24 and is, in turn, drawn into cam chamber 18.

In accordance with this invention, the volume of output 28 from the pump is controlled by recycling a portion of the pumped fluid through a bypass port 30 to suction passage 24, as indicated by arrow 32. For this purpose, a bore 34 is provided in housing 12. Bore 34 has an axis 36 and is closed at one end by adapter 26, with bore 34 communicating with outlet passage 27. Bore 34 also communicates with discharge port 20 at a first axial location and with bypass port 30 at a second axial location that is axially spaced from the first location.

Fluid to bypass port 30 is controlled by a flow control valve 38 slideably received in bore 34. Valve 38 comprises a peripheral surface 40 that includes lands and grooves for providing a slideable seal with the bore. Valve 38 is adapted to axially slide between an open position shown in FIG. 1 wherein fluid discharge port 20 and fluid bypass port 30 communicate through bore 34 for recycling a portion of the fluid through the bypass port, and a fully closed position shown in FIG. 2 wherein bypass port 30 is closed by valve 38, so that the entire volume of pumped fluid is directed to output 28. Valve 38 and bypass port 30 cooperate to define an opening to J the bypass port. It is an advantage of this invention that the valve may be moved to a position intermediate the closed position and the fully retracted position. In this manner, the size of the opening to the bypass port may be varied to increase or decrease the fluid flow into the bypass port. By varying the proportion of fluid flow to the bypass port, output 28 from the pump may be adjusted to a desired volume.

In accordance with this invention, valve 38 is opened and closed by a solenoid assembly 50 that includes an actuator 52 responsive to an electromagnetic field applied by an electromagnetic coil 54. Solenoid assembly 50 includes a bracket 56 for mounting the assembly to housing 12 at an end of bore 34 opposite outlet passage 27. Actuator 52 is axially slideably received in a tubular sleeve 58 fixed to bracket 56. Extension 58 is sealed by an end cap 60, thereby sealing actuator 52 within the extension. Actuator 52 is connected to valve 38 by a rod 62 that extends through bracket 56. Rod 62 includes a central axial passage 64 that communicates with a central axial passage 66 through plunger 52 for equalizing fluid pressure to facilitate movement of plunger 52 during opening and closing of valve 38. Although not shown in the depicted embodiment, end cap 60 may include a pressure transducer for monitoring fluid pressure within bore 34 through passages 64 and 66. A coil spring 68 about rod 62 between bracket 56 and actuator 52 biases the actuator against end plug 60 to thereby bias valve 38 in the open position. Actuator 52 is preferably formed of iron or other suitable magnetizeable material, whereas extension 58, end plug 60 and coil 68 are preferably formed of aluminum or other material that is not affected by an applied electromagnetic field. Electromagnetic coil 54 includes terminal 70 protected by shield 72 for connection to an external electrical power source.

Prior to operation, valve 38 is biased in the open position shown in FIG. 1. In the open position, coil spring 68 is extended to bias actuator 52 so that its rear end 80 abuts end cap 60.

During operation, rotor 14 is driven by the engine of the automotive vehicle through a belt and pulley arrangement. The pumping elements, rotors 14, vane 26 and cam chamber 18, are preferably sized so that, at low engine speeds, the volume of pumped fluid is equal to the desired output 28 of pump 10. Under these circumstances, it is desired that no portion of the pumped fluid be returned through bypass port 30. This is accomplished by positioning valve 38 to close bypass port 30 from fluid communication with fluid discharge port 20, as shown in FIG. 2. To close valve 38, electrical current is conducted through coil 54 through terminal 70 and generates an electromagnetic field within extension 58. In response to the applied electromagnetic field, actuator 52 is magnetized and axially slides in extension 58 to advance valve 38 into the closed position. The advance of actuator 52 is facilitated by fluid flow through passages 62 and 66 to equalize the fluid pressure against end face 80 of actuator 52 with the fluid pressure within bore 34 adjacent fluid discharge port 20. The advance of actuator 52 contracts spring 68. In this embodiment, the forward movement of actuator 52 is stopped by spring 68 in the fully compressed state and determines the position of valve 38 in the closed position.

It is an advantage of this invention that the position of valve 38 may be varied to control the pump output 28 to optimize performance of the power steering system for particular driving conditions. By way of example, an optimum pump output may be determined based upon vehicle speed, steering wheel rate, and fluid pressure within the power steering system. For this purpose, a control module may be provided for regulating current to electromagnetic coil 54. The control module may receive input, for example, for vehicle speed and steering signals, and determine an optimum system pressure using a look-up table or algorithm. The control module may determine an adjustment to the current to the electromagnetic coil to adjust the position of the flow control valve. In this manner, the flow control valve can be moved to adjust the size of the opening to the bypass port and so increase or decrease the proportion of pumped fluid. Opening the valve increases flow of fluid through the bypass and decreases output 28, whereas closing the valve decreases flow to the bypass and increases output 28. By making appropriate adjustments to the position of the flow control valve and thus to the size of the opening to the fluid bypass port, an optimum output may be obtained for particular driving conditions.

Therefore, this invention provides a power steering pump wherein the flow control valve cooperates with the bypass port to define the size of the opening to the bypass port and thereby regulate the flow of fluid through the bypass, with the advantage of inversely regulating the output from the pump. This is in marked contrast to conventional pumps having mechanical valves that restrict flow through the outlet, thereby increasing pressure within the bore to fully open valve and divert excess fluid to the bypass. In this invention, the position of the flow control valve may be adjusted electronically to regulate the size of the opening to a bypass port. This is accomplished by a solenoid assembly connected to the valve that opens and closes the valve in response to electric current to an electromagnetic coil. The solenoid assembly is readily mounted on the pump and connected to the electronic control system for the automotive vehicle. By adjusting the fluid volume through the bypass port, the flow control system with this invention permits the output of the power steering pump to be adjusted for a desired value.

In the described embodiment, the flow control valve was actuated by a solenoid assembly that moves the valve axially within the bore. In an alternate embodiment, the flow control valve may be rotated to open and close the opening to the bypass port. The flow control is connected to a step motor or other suitable electronic actuator capable of varying the angular orientation of the valve. The valve may be a partial cylinder having an edge that cooperates to define the size of the opening to the bypass port. Alternately, the flow control valve may have a perforation that registers with the bypass port in the fully open position, and rotates to partially or fully close the bypass port and thereby adjust the size of the opening thereto.

While this invention has been described in terms of certain embodiment thereof, it is not intended to be so limited, but rather only to the extent set forth in the claims that follow.

The invention claimed is:

1. A power steering pump comprising:
   a housing, which includes a bore having an axis, a fluid discharge port communicating with said bore at a first axial location, a fluid bypass port communicating with said bore at a second axial location with an inlet through which fluid enters said bypass port from said bore, and a fluid outlet passage at a first end of said bore communicating with said fluid discharge port and said bore;
   a cylindrical flow control valve located at a second end of said bore, having first and second ends with said first end extending into said bore and said valve being axially displaceable along said axis from a first location in which said bypass port inlet is in an unobstructed open condition and into other locations within a defined range which cause a corresponding degree of interruption of fluid flow into said bypass port inlet, including a fully obstructed closed condition;
   an actuator element rigidly secured via a rod element to said second end of said flow control valve and being axially displaceable with said rod element and said valve along said axis in response to forces being applied thereto;
   a coil spring about said rod element, said spring being seated between said housing at said second end of said bore and said actuator element to provide a bias force against said actuator element and to place said flow control valve in said first location in the absence of other opposing forces; and
   an electromagnetic coil mounted to said housing and surrounding said actuator element for generating an electromagnetic field that applies electromagnetic forces to move said actuator element, said rod element and said flow control valve along said axis against the bias forces of said spring to position said flow control valve at locations within said range; and
   wherein said flow control valve, said rod element and said actuator element each have a continuous open fluid passage coaxially located in each to extend from said first end of said valve and through said actuator element to be in communication with fluid in said bore.

2. A power steering pump comprising:
   a housing including a bore having an axis, a fluid discharge port communicating with said bore at a first axial location, a fluid bypass port communicating with said bore at a second axial location and including an inlet at said bypass port through which fluid enters said bypass port from said bore, and a fluid outlet passage communicating with said fluid discharge port and said bore;
   a flow control valve located in said bore and being axially displaceable along said axis in a range of locations to cause said inlet to be fully open, partially open and fully closed for proportioned fluid bypass control;
   an electromagnetic coil for producing an electromagnetic field;
   a plunger for moving said flow control valve along said axis at said inlet, said plunger being rigidly secured via a rod element to said flow control valve and being axially displaceable along said axis in response to said electromagnetic field;
   a spring including a first end and a second end axially opposite said first end, having said first end seated against said housing and said second end seated against said plunger, and disposed to surround a portion of said rod element to provide a biasing force against said plunger, said rod element and said control valve that causes said inlet to remain in a fully open condition when no electromagnetic field is generated;
   wherein said flow control valve, said rod element and said plunger each have a continuous open fluid passage coaxially located in each to extend through said valve, said rod element and said plunger to be in communication with fluid in said bore.

3. A power steering pump in accordance with claim 1 wherein said flow control valve slides axially to vary the size of said inlet and to regulate fluid flow into said fluid bypass port.

4. A power steering pump in accordance with claim 1 further comprising pumping elements disposed within said housing, said pumping elements comprising a cam chamber and a rotor having retractable vanes disposed within said cam chamber.

5. A power steering pump in accordance with claim 1 wherein the electromagnetic field urges said flow control valve to close said inlet of said bypass port, and said spring urges said flow control valve to open said inlet of said bypass port.

* * * * *